(No Model.) 2 Sheets—Sheet 1.

J. E. RETTIG.
INLET VALVE FOR DIGESTERS.

No. 502,635. Patented Aug. 1, 1893.

Witnesses
Percy C. Bowen
John C. Wilson

Inventor
Julius E. Rettig,
By Whitman & Wilkinson,
Attorneys.

(No Model.) 2 Sheets—Sheet 2.

J. E. RETTIG.
INLET VALVE FOR DIGESTERS.

No. 502,635. Patented Aug. 1, 1893.

Witnesses
Percy C. Bowen
John C. Wilson

Inventor
Julius E. Rettig
By Whitman & Wilkinson
Attorneys

UNITED STATES PATENT OFFICE.

JULIUS E. RETTIG, OF WASHINGTON, DISTRICT OF COLUMBIA.

INLET-VALVE FOR DIGESTERS.

SPECIFICATION forming part of Letters Patent No. 502,635, dated August 1, 1893.

Application filed November 7, 1892. Serial No. 451,232. (No model.)

*To all whom it may concern:*

Be it known that I, JULIUS E. RETTIG, a citizen of the United States, residing at Washington, in the District of Columbia, have invented certain new and useful Improvements in Inlet-Valves for Digesters; and I do hereby declare the following to be a full, clear, and exact description of the invention, such as will enable others skilled in the art to which it appertains to make and use the same.

My invention relates to improvements in valves for closing large apertures of any description where it is desired to provide a removable cap or closure, and where, at the same time a tight joint is to be made.

While this invention is applicable to boilers and heaters of various descriptions, it is specially designed for use in digesters or driers used in treating garbage.

The said invention will be understood by reference to the accompanying drawings wherein the same parts are indicated by the same letters throughout the several views.

Figure 1:
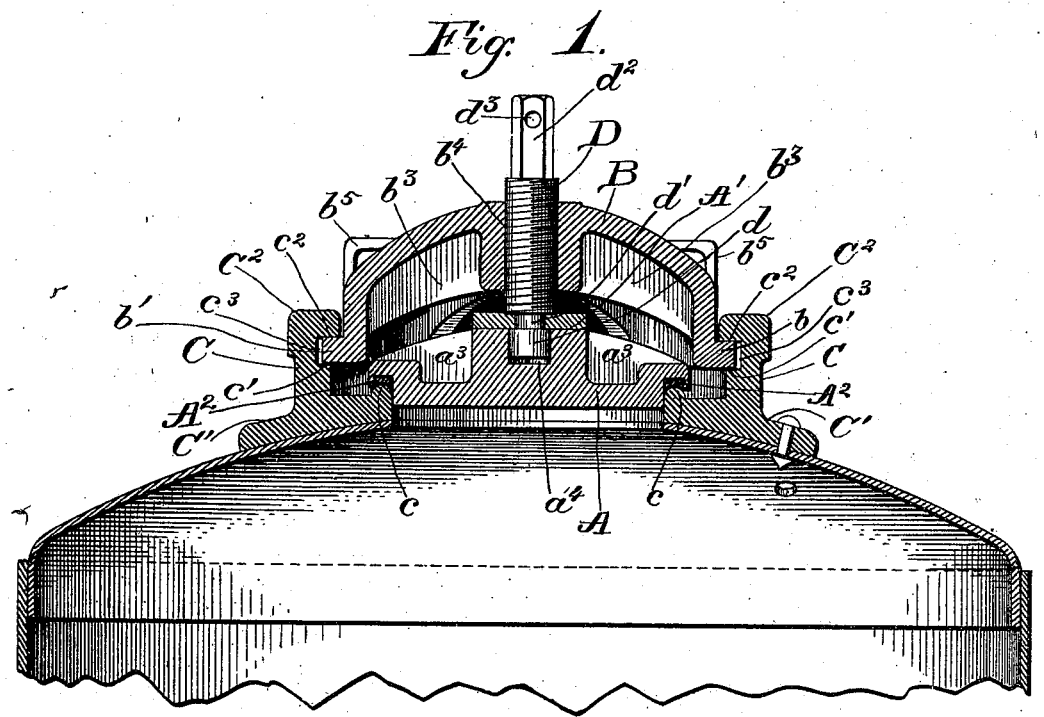
Figure 2:
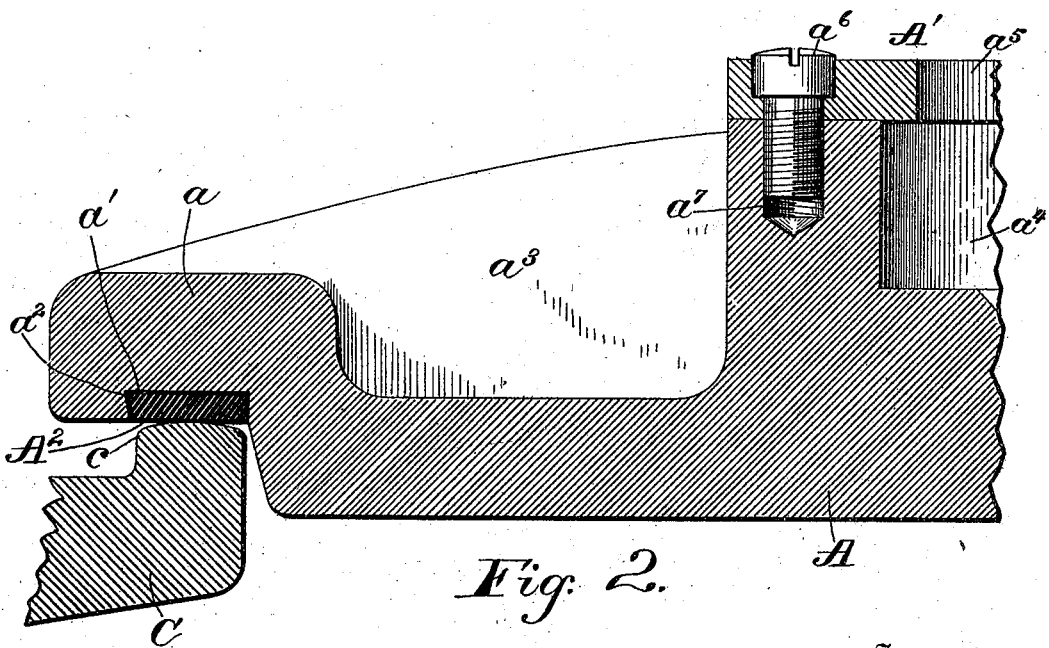
Figure 3:
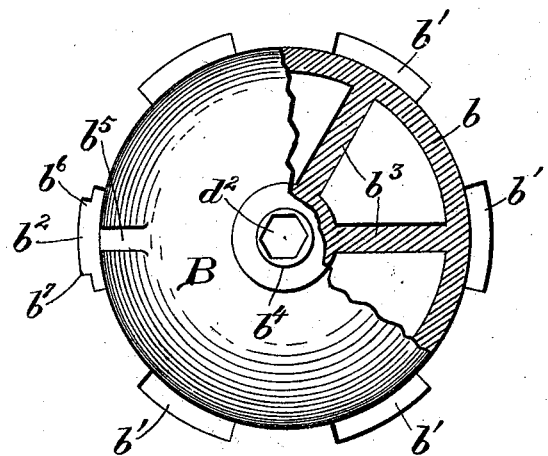
Figure 4:
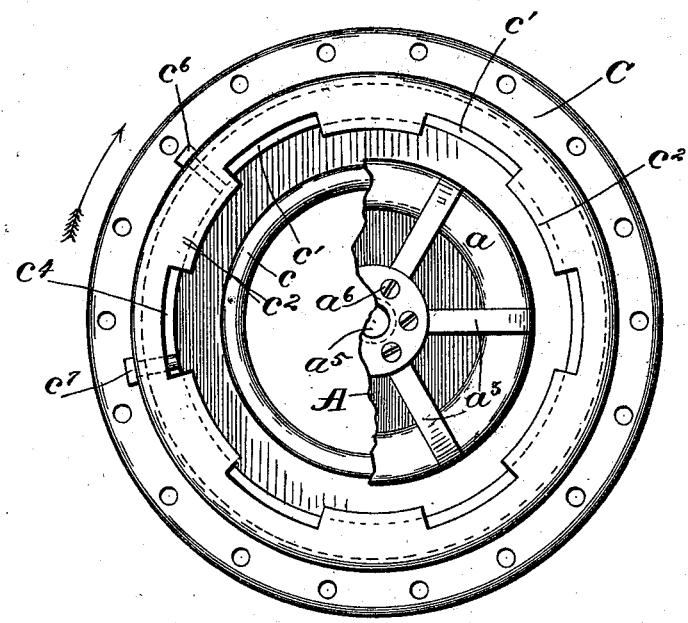

Figure 1 represents a central vertical section through the upper end of a digester or other vessel fitted with the improved valve. Fig. 2 represents a similar section through one side of the valve. Fig. 3 represents a plan view of the valve cover, parts being broken away to show the strengthening ribs. Fig. 4 represents a plan view of the valve seat, with the valve thereon, part of the valve being represented as broken away.

A represents the valve.

B represents the valve cover.

C represents the valve seat, and D represents the screw for holding the valve cover and valve together.

The valve A is provided with an annular flange $a$, having a recess $a'$ on the under side thereof, dove-tailed at $a^2$ and adapted to hold a lead ring $A^2$. The valve is strengthened with radial ribs $a^3$, and is provided at its center with a cylindrical chamber $a^4$. This chamber is surmounted by a ring $A'$ secured to the valve proper by screw bolts $a^6$, and provided at its center with a cylindrical aperture $a^5$ concentric with and smaller in diameter than the chamber $a^4$.

The valve cover B is dome-shaped, and is provided at its lower side with a ring $b$ from which project a number of lugs $b'$, one of which as $b^2$ is provided with shoulders $b^6$ and $b^7$ for purposes hereinafter to be described. Vertical radial ribs $b^3$ give strength to the valve cover, while a screw thread $b^4$ is cut in the center thereof for the passage of the screw D. Lugs $b^5$ are provided for the purpose of turning the valve cover in its seat and to act as handles or eyes for lifting the same out of its seat.

The valve seat C is riveted to the top of the vessel in the ordinary way, through the flange C'. The inner and upper edge of said flange terminates in a curved ring $c$ adapted to fit under and press up into the lead ring $A^2$. The valve seat as seen from the above, is divided into a number of recesses $c'$ and projections $c^2$ corresponding to the lugs $b'$ of the valve cover, while an annular groove $c^3$ is cut out of the upper portion $C^2$ of the valve seat, engaging the lugs $b'$ as shown in Fig. 1. Bolts $c^6$ and $c^7$ are provided in the valve seat as shown in Fig. 4.

The valve cover and valve are held together by the screw D provided with a head $d$, which is held by the ring $A'$ in the cylindrical chamber $a^4$. The neck $d'$ is revolubly fitted in the aperture $a^5$ of the said ring.

The screw D fits in a corresponding female screw $b^4$ in the valve cover and is provided with an angular head $d^2$, and a hole $d^3$ which may be used for a wrench or a capstan bar, as the case may be. The hole $d^3$ may also be used for hoisting out the cover and valve, or they may be hoisted out by means of the eyes $b^5$.

The operation of the device is as follows:— The head $d$ being inserted in the chamber $a^4$, the ring $A'$ being secured the neck $d'$, and the valve cover B being slipped over the screw D and screwed down into approximately the desired position, the whole thing, valve, valve cover and screw, is lifted over the valve seat and turned, so that the lug $b^2$ is over the recess $c^4$ and the lugs $b'$ over the recesses $c'$, when the valve and valve cover are lowered into place. As soon as the lower faces of the lugs $b'$ and $b^2$ strike the base of the annular recess $c^3$, the valve cover is turned to the right in the direction of the arrow in Fig. 4, until the face $b^6$ of the lug $b^2$ strikes the stop bolt $c^6$ at which time all of the lugs $b'$ and $b^2$ engage beneath the corresponding projection $c^2$. The screw B is then screwed down, pressing the valve A firmly on the raised rib or ring $c$ which presses up into the lead ring $A^2$ making a tight joint. In order to remove the valve, unscrew the screw D, turn the valve cover to the left in the direction opposite to the arrow in Fig. 4, until the face $b^7$ of the rib $b^2$ strikes the stop bolt $c^7$, when the valve and valve cover may be lifted clear of the seat, and removed entirely from the top of the vessel. It will be seen that by this method, a rapid and convenient mode of closing the vessel is obtained.

This device is particularly applicable to vessels subjected to internal pressure where it becomes necessary to rapidly open and close apertures of large size, and for this reason it possesses exceptional advantages for use in retorts intended to receive garbage or other bulky material for treatment under pressure.

Having thus described my invention, what I claim, and desire to secure by Letters Patent of the United States, is—

1. The combination with a valve seat provided with an annular rib and an annular recess surmounted by alternate lugs and depressions exterior to said rib; of a valve provided with a ring of yielding material adapted to bear on said annular rib, a valve cover having a plurality of lugs adapted to slip into said annular recess and to engage beneath said lugs in the valve seat, the said valve cover having a female screw in the center thereof, and a screw revolubly connected to said valve and passing through said female screw in the valve cover, substantially as and for the purposes described.

2. The combination with a valve seat C provided with an annular rib $c$, and an annular recess $c^3$ surmounted by alternate lugs $c^2$ and depressions $c'$ and stop bolts $c^6$ and $c^7$, the said lugs and depressions being exterior to the said rib $c$; of a valve A provided with a lead ring $A^2$ adapted to bear on said rib $c$ and a collar $A'$ rigidly attached to said valve, a valve cover B having a plurality of lugs $b'$ adapted to slip into said annular recess and to engage beneath said lugs in the valve seat, and lugs $b^5$ for turning said valve cover and the said valve cover having a female screw $b^4$ in the center thereof; and a screw D having a head $d'$ held beneath said collar $A'$ and engaging in said female screw $b^4$, substantially as and for the purposes described.

3. The combination with a valve seat C provided with an annular rib $c$, and an annular recess $c^3$ surmounted by alternate lugs $c^2$ and depressions $c'$, the said lugs and depressions being exterior to the said rib $c$; of a valve A provided with a lead ring $A^2$ adapted to bear on said rib $c$, and a collar $A'$ rigidly attached to said valve; a valve cover B having a plurality of lugs $b'$ adapted to slip into said annular recess and to engage beneath said lugs in the valve seat and the said valve cover having a female screw in the center thereof; and a screw D having a head $d'$ held beneath said collar $A'$, and engaging in said female screw $b^4$, substantially as and for the purposes described.

In testimony whereof I affix my signature in presence of two witnesses.

JULIUS E. RETTIG.

Witnesses:
LYMAN F. W. CUSHING,
PAUL J. PELZ.